INFORMATION CONVERTER ARRANGEMENT

Filed July 24, 1963

Keith F. Stultz
Hans J. Zweig
INVENTORS
BY R. Frank Smith
David P. Ogden
ATTORNEYS United States Patent Office 3,271,758
Patented Sept. 6, 1966

3,271,758

INFORMATION CONVERTER ARRANGEMENT

Keith F. Stultz, Rochester, N.Y., and Hans J. Zweig, Mountain View, Calif., assignors to Eastman Kodak Company, Rochester, N.Y., a corporation of New Jersey Filed July 24, 1963, Ser. No. 297,262
12 Claims. (Cl. 340—347)

The present invention relates to an information converter arrangement and, more particularly, to a digital-to-analog converter.

In the art of information storage and retrieval, equipments are available for utilizing digital or analog information. Binary digital information consists of one bit digit of information indicating a magnitude of 0 or 1, a second digit of information indicating a magnitude of 0 or 2, a third digit of information indicating 0 or 4, etc. The magnitudes attainable using these three binary digits would be 0, 1, 2, 3, 4, 5, 6 or 7, depending on whether or not some of the digits are in the zero condition. Analog storage is substantially different in that information is stored in magnitudes equaling 0, 1, 3, 4, or 5, etc. Usually, an equipment operable to produce or use digital information is of no value concerning the direct recording or retrieval of analog information and vice versa. Therefore, many arrangements have been developed wherein digital signals are converted, as by electronic counters, etc., to analog information. At the present time, a great deal of information, particularly digital information, is stored on photographic film having substantially clear strip windows, wherein several digits of information are recordable. Depending on which digit portions are made substantially opaque, a permanent storage memory is provided. However, these digital number recordings, although they may be rapidly reviewed by optical systems, have not been directly readable to attain analog signal information. With such a system, it would become feasible to store all information in digital form and read it into either analog or digital equipment.

Therefore, an object of the present invention is to provide a simple and reliable information converter arrangement useful in developing analog signal information from digital records.

Another object is to provide an optical arrangement for converting digital information from an optically encoded medium directly into an analog signal.

As used herein, the recorded "number" or "strip number" refers to a group or strip of discrete areas of a record member, one representing each digit of a multi-digit number (five digits in examples illustrated in this case). In the binary recording system used herein for illustrative purposes each area can represent either of two distinct ordinal values, corresponding respectively to a "0" or "1" in binary nomenclature. As shown an area of high light absorption or density is considered to represent a binary "0"; a clear or low density area represents a binary "1." The number of distinct ordinal values which can thus be represented by any particular order digit is called the radix of the number. Thus in the binary system used as an example herein, the radix is two; in a decimal system the radix would be ten. It should also be pointed out that the analog value represented by a digit of a particular ordinal value and of a given digit position or digit order, will be equal to that of a similar digit in the next lower-order digit position, multiplied by the value of the radix. Thus in the binary system (radix=2), a "1" in the second-order digit position has a value of 2 (two times that of "1" in the first-order position); a "1" in the third-order position has a value of 4; in the fourth-order position, a value of 8, etc. Similarly, in a decimal system (radix=10) a "3," for example, in the second-order digit position (tens column) represents a value ten times larger than a "3" in the first-order digit position (units column). Also, "analog" or "analog-type signals" is intended generally to include signal information of varying magnitude, whether carried by light flux, sound waves, electricity or the like. Thus, the first digit of a binary system may provide a signal of zero or one in analog form, the fifth digit may provide a signal of zero or sixteen in analog form, etc.

In accordance with one embodiment of our invention, a digit-value weighting means in the form of an optical wedge or step tablet is placed selectively over each strip window number containing bits of digital information recorded on a window-type arrangement. In the region of the minimal signals, i.e., the first-order digit or 0–1 bit of information, the density of the wedge or tablet is maximum to provide a small or unit light transmission therethrough. On the area corresponding to the next or second-order digit (0 or 2), the density of the wedge is ½ as great to provide two units of light transmission when this window is clear. The next or third-order digit area of the wedge has a density again equal to half that in the 0–2 digit, whereby four units of light will be transmitted when this digit is clear. Thus, if the first three digit windows are clear, a signal of 7 light units will be transmitted by the wedge; if the first four digit windows are clear, 15 units of light will be transmitted; etc. A light-sensitive detector receptive of this light develops corresponding analog signal information.

The subject matter which is regarded as our invention is particularly pointed out and distinctly claimed in the concluding portion of this specification. The invention, however, as to its organization and operation together with further objects and advantages thereof, will best be understood by reference to the following description taken in connection with the accompanying drawing in which:

Figures 1, 2, 3:
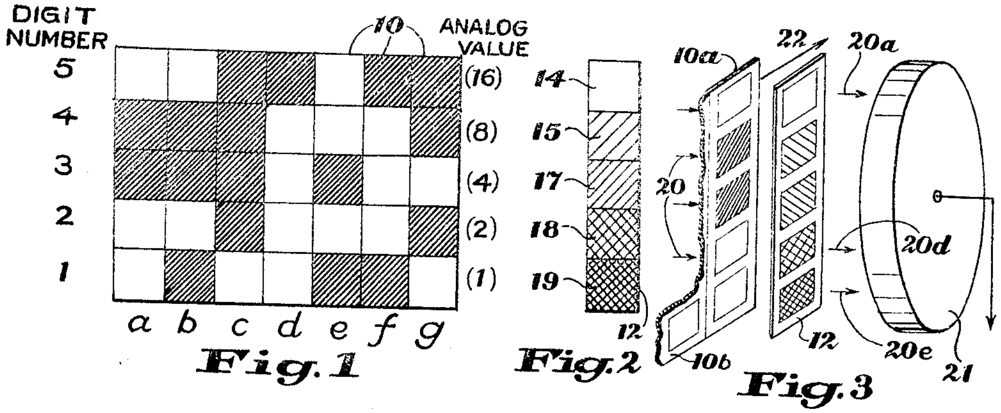
FIG. 1 is a schematic view of a series of photographically stored five digit binary numbers.
FIG. 2 is a schematic illustration of a density wedge usable in accordance with the present invention to convert the digital informations of FIG. 1 to analog light signals.
FIG. 3 illustrates information conversion characterized by the super-positioning of one digital number and the wedge shown in FIG. 2.

Referring now to the drawing wherein like numbers refer to similiar parts, we have shown in FIG. 1 a digital strip 10 having numbers *a*, *b*, *c*, *d*, *e*, *f*, and *g*. Although it is a usual practice to use transparent film strips 10 whereby light flux may be transmitted therethrough, opaque print strips may also be used with light flux being reflected thereby. The number *a* is substantially opaque in the third order digit (corresponding to 0–4 units) and in the fourth digit (corresponding to 0–8 units), and transparent in the first, second, and fifth digits, whereby the magnitude of the signal stored on this strip number is 19 in decimal form on 10011 in binary digital form. The number *b* is opaque in the first, third and fourth digits and transparent in the second and fifth digits to provide signal information indicative of 18 in decimal form or 10010 in digital form. The number *c* is clear only in the first digit and will provide a signal of 1 or 00001. Strip number *d* is opaque only in the fifth digit and will provide a signal of 15, etc. Thus, each strip number may be scanned optically to provide a distinguishable signal.

In FIG. 2, we have shown a digit-value weighting means in the form of a mask or density step tablet 12 having a substantially clear area 14 alignable with the fifth order digit. An adjacent area 15 is alignable with the fourth order digit and, when using a binary system, has a density equal to .3, whereby half as much light may be transmitted therethrough when the fourth order digit is clear as may be transmitted through the fifth order digit. A wedge area 17 has a density of .6 whereby ½ as much light is transmitted as is transmitted through wedge area 15. Similarly, areas 18 and 19 have .9 and 1.2 densities respectively. By utilizing light-sensitive equipment which will detect light transmitted through the 1.2 density portion as one unit, through the .9 density portion as two units, through the .6 density portion as four units, etc., analog signals are attainable from the combination of each number on the strip 10 and the wedge or tablet 12.

The operation of this tablet 12 is shown more clearly in FIG. 3, wherein the wedge is placed momentarily over the digital strip number 10*a* having clear first, second, and fifth digit regions and opaque third and fourth digit regions or 10011. By applying selected equal amounts of light flux, as indicated by the arrows 20, through both the number strip section 10*a* and the tablet 12, the total transmission of the combination impinging on a light-sensitive detector 21 is 16 (arrow 20*a*)+2 (arrow 20*d*)+1 (arrow 20*e*) or 19 units of light. The transmission of the light flux through the third and fourth digit regions has been prevented by the number strip section 10*a*, and the light flux through the first and second digit regions has been reduced by the density tablet 12.

This light flux is convertible by photocells and the like in the detector 21 to voltages or electric currents usable by analog or recording, etc., equipment. As indicated in FIGS. 1 and 3, respectively, the precise arrangement of the digital information is not critical to our invention as long as the light-sensitive detector 21 and the light flux 20 are properly calibrated. Thus, the density wedge or tablet 12 distinguishes between the several digit regions, and the light-sensitive detector 21, being receptive of all light flux transmitted, is able to accumulate the light flux from the several digit regions and provide an analog signal indicative of the sum.

Although single strip section reading conversion, as explained above, is of considerable value, usually it is desired to search and read stored signals rapidly as by high-speed scanning equipment. Therefore, we prefer to drive the number strip 10 past the scanning equipment, as indicated by the arrow 22.

Figure 4:
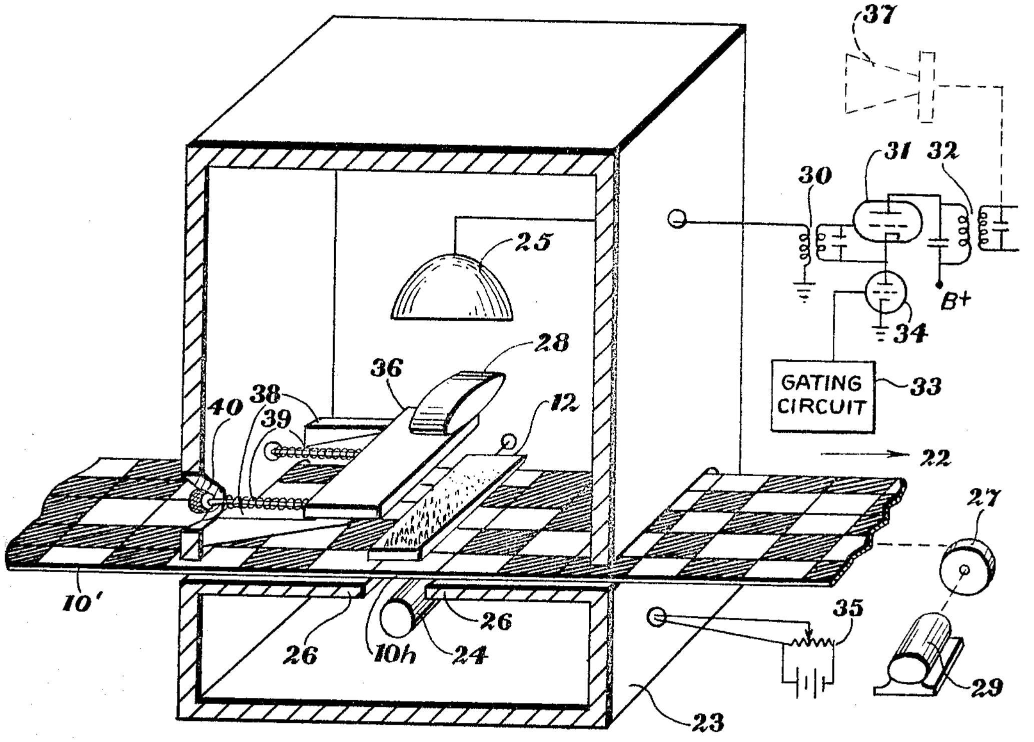
FIG. 4 is a simplified schematic illustration of how a strip of digital numbers may be converted rapidly to analog signals.

Referring now to FIG. 4, we have shown, by way of example, a simplified arrangement for rapidly scanning a strip 10' having many adjacent digital numbers thereon. The strip 10' is moved rapidly through a scanning station within a lighttight box 23 having a lamp 24 on one side of the strip 10' and a photomultiplier receptor 25 on the other side thereof. The lamp 24 is substantially enclosed by the lower portion of the box 23 and by light shields 26 which prevent light from reaching the photomultiplier 25 except through a single number strip section 10*h* of the strip 10'. In one arrangement, the wedge or tablet 12 and a lens 28 are positioned over the film strip 10' for coding and collecting the light flux traversing the strip section 10*h*. Obviously, the light flux could be reflected by mirrors or directly from an opaque strip 10 having reflective and non-reflective digit regions. Also, the light flux summing means may include curved mirrors, a large photocell or other means than the lens 28.

Using certain types of the film strip 10' driven at 80 f.p.m., individual pulses are detected at a rate of about 20,000 per second. As indicated in FIG. 4, the film strip 10' is collected on a take-up reel 27 driven by a motor 29. With such a signal rate, the output may be used to drive a simple amplifier circuit, as indicated by an input transformer 30, a triode 31 and an output transformer 32. The output signal of this equipment is sufficient to drive regular amplifiers and the like to accomplish signal strengths necessary for analog computers or other electronic applications. We also have indicated a gating circuit 33 which is energized in accordance with the location of each strip section in the viewing location to synchronize the signal passing through the tube 31. As illustrated, the gating circuit 33 controls a gating tube 34 in the cathode circuit of the tube 31. Obviously, many other types of interpretive equipment may be used with the signal information developed by the strip 10', the light 24 and the wedge 12. For instance, the strip may be driven to provide variations of light flux intensity which are directly convertible to intelligible sound waves by a speaker 37 indicated in phantom.

An important consideration of the present invention is proper calibration of the output signal information. There are several approaches to this problem. We prefer that the voltage applied to the lamp 24 be adjustable as by a rheostat 35 to control the light flux thereof and thus calibrate the energization of the light detector 21 (FIG. 3) and the photomultiplier 25 (FIG. 4) to obtain an accurately reproduced magnitude of signals. Also, we have provided an adjustable light baffle 36 which may be imposed between a portion of the wedge 12 and the lens 28. A simple arrangement of this baffle 36 is illustrated wherein it is supported on a pair of support arms 38 and with the baffle 36 being positioned thereover in accordance with the spring arrangement 39 under the control of knurled nuts as indicated at 40. The wedge 12 is similarly supported to provide control of the location of its densest and least dense portions.

In the event that the signals derived from the first, second and third digit regions are properly adjusted while the fourth and fifth digit regions are maladjusted to provide, for instance, 9 and 19 units of light flux respectively, the location of the rear portion of the light baffle 36 may be extended slightly to partially block the light transmitted to the photomultiplier 25. A somewhat similar adjustment may be accomplished by regulating the light intensity directly or by adjusting the position of the wedge or tablet 12. The particular tuning sequence necessary to obtain a most stable operation depends upon the light sensitivity of the photomultiplier 25, the optical properties of the lens 28 and of the density wedge 12.

While we have shown and described particular embodiments of the present invention, other modifications may occur to those skilled in this art. For instance, the wedge or mask 12 can be placed between the light source and the strip section being used to thereby provide encoded light flux to the several digit regions, with a minimum or unit light flux being directed to the 0–1 or first-order digit region, twice as much light flux being directed to the 0–2 or second-order digit region, etc. Moreover, the light transmitted may be stored or summed on a film strip in analog form instead of using a photocell system. Furthermore, this invention is, of course, not restricted to a binary digital system and is equally applicable to devices using number systems of any modulus or radix such as a ternary number system. In such a case where the modulus or radix is other than binary, the density variation from digit to digit of the density control means would be other than .3. We intend, therefore, to have the appended claims cover all modifications which fall within the true spirit and scope of our invention.

We claim:

1. A digital-to-analog converter for deriving the analog value of a multi-digit number of predetermined radix, recorded on a record member with each digit of the number recorded in a separate discrete area of said record member, the relative position and light-absorption characteristics of each such area indicating respectively the digit order and the ordinal value of the corresponding digit, said converter comprising:

a source of illumination;

light-sensing means positioned to receive light from said source;

means for supporting said record member in the path of the light from said source to said sensing means whereby the light falling on said sensing means will be intensity-modulated in accordance with the digits recorded on said record member; and digit-value weighting means interposed in the path of light from said source to said sensing means in such relation to said record member as to further differentially intensity-modulate the light reaching said sensing means from individual discrete digit areas of said record member in accordance with the radix of said number and the digit order represented by each such digit area, whereby the over-all amount of light falling on said sensing means is proportional to the analog value of said recorded number.

2. The invention according to claim 1, said digit-value weighting means comprising an optical step-tablet having separate areas of discretely different light-absorption characteristics corresponding to individual digit areas of said record member, the ratio of the light-absorption characteristic of that area of said tablet corresponding to any given-order digit to that for the next higher-order digit being substantially equal to the radix of said number.

3. The invention according to claim 1, wherein said digit-value weighting means is positioned and arranged so that light reaching said sensing means by way of different digit areas of said record member will pass through corresponding separate areas of said weighting means, the transmittances of said separate areas being uniquely related to the corresponding digit-orders and the radix of said number.

4. A digit-to-analog converter for deriving the analog value of a multi-digit number of radix R recorded on a record member with each digit of the number recorded in a separate discrete area, the relative position and light-absorption characteristics of each such area indicating respectively the digit-order and the ordinal value of the corresponding digit, said converter comprising:

a source of illumination, light-flux sensing means, means for directing light flux from said source along a predetermined path toward said sensing means, digit-value weighting means interposed in said path and including a plurality of distinct light-transmitting portions, one corresponding to each digit of said recorded number, the light-transmitting characteristics of said portions being related to the orders of the digits and the radix of said number so that under equal conditions of illumination the light flux transmitted towards said sensing means by that portion corresponding to any particular-order digit will be R-times greater than that transmitted by the portion corresponding to the next-lower-order digit, and means for positioning said record member in said path so that the passage of light flux to said sensing means by way of any one of said portions will be controlled by the corresponding discrete digit area of said record member.

5. The invention according to claim 4 wherein said record member is interposed in said path between said weighting means and said source.

6. The invention according to claim 4 wherein said weighting means comprises an optical step tablet, said portions of said weighting means being constituted by distinct areas of said tablet having individually different optical densities.

7. The invention according to claim 4 including optical means for collecting the light passed by said record member and said weighting means and directing it onto said sensing means.

8. The invention according to claim 4 comprising means responsive to the total light flux falling on said sensing means for producing an output signal of an amplitude proportional thereto.

9. The invention according to claim 8 including means correlated with the means for positioning said record member for rendering said output-signal-producing means operative only when a recorded number is properly positioned within said light path.

10. The invention according to claim 4 wherein said record member has a plurality of such multi-digit numbers recorded on separate portions thereof, said converter including means for restricting the path of light from said source to said sensing means at a given time to a single one of said portions of said record member.

11. The invention according to claim 10, including means for producing relative movement between said record member and said light path to cause different ones of said number-bearing portions to be sequentially interposed in said light path.

12. The invention according to claim 11, further including means responsive to the total light flux falling on said sensing means for producing an output signal of an amplitude proportional thereto, and means responsive to the operation of said movement-producing means for rendering said output-signal-producing means operative only when one of said portions of said record member is properly positioned in said light path.

References Cited by the Examiner

UNITED STATES PATENTS

| | | | |
|---|---|---|---|
| 2,337,534 | 12/1943 | Barber | 35—1 |
| 2,855,539 | 10/1958 | Hoover | 315—8.5 |
| 3,193,687 | 7/1965 | Hatcher | 250—216 |

MAYNARD R. WILBUR, *Primary Examiner.*

MALCOLM A. MORRISON, *Examiner.*

W. J. ATKINS, *Assistant Examiner.*